United States Patent
Garakani et al.

(10) Patent No.: US 6,240,208 B1
(45) Date of Patent: May 29, 2001

(54) METHOD FOR AUTOMATIC VISUAL IDENTIFICATION OF A REFERENCE SITE IN AN IMAGE

(75) Inventors: Arman Garakani, Wellesley; Leonid Taycher, Brighton, both of MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/129,152

(22) Filed: Aug. 5, 1998

Related U.S. Application Data

(60) Provisional application No. 60/093,916, filed on Jul. 23, 1998, and provisional application No. 60/095,087, filed on Aug. 3, 1998.

(51) Int. Cl.[7] ............................. G06K 9/00; G06K 9/40; G06K 9/46; G06K 9/36; G06K 9/62
(52) U.S. Cl. .......................... 382/190; 382/181; 382/209; 382/261; 382/265; 382/287; 382/160
(58) Field of Search ................................ 382/190, 209, 382/261, 265, 275, 160, 287, 181; 348/607, 610

(56) References Cited

U.S. PATENT DOCUMENTS

| | | | |
|---|---|---|---|
| 5,067,162 | * 11/1991 | Driscoll, Jr. et al. | 382/126 |
| 5,218,649 | * 6/1993 | Kundu et al. | 382/180 |
| 5,594,807 | * 1/1997 | Liu | 382/261 |
| 5,818,964 | * 10/1998 | Itoh | 382/261 |
| 5,917,928 | * 6/1999 | Shpuntov et al. | 382/124 |
| 5,956,432 | * 9/1999 | Ohta | 382/261 |
| 5,970,179 | * 10/1999 | Ito | 382/261 |
| 5,982,940 | * 11/1999 | Sawada | 382/260 |
| 6,035,072 | * 3/2000 | Read | 382/275 |

OTHER PUBLICATIONS

Cognex 3000/4000/5000 Programmable Vision Engines Vision Tools, rev. 7.4, 1996. Ch.10, pp459–474.

* cited by examiner

Primary Examiner—Leo Boudreau
Assistant Examiner—Daniel G. Mariam
(74) Attorney, Agent, or Firm—Russ Weinzimmer

(57) ABSTRACT

An efficient and reliable method that identifies possible reference sites in an image is disclosed. The method emphasizes customizing the identification of reference sites for each application by providing for initialization of various parameters, such as the size of the reference site. The method then uses a series of measurable parameters to filter possible reference sites in the image and produces and ordered set of possible reference sites. The highest-ranking site of the ordered set is expected to be chosen as the reference site for production. A preferred implementation is disclosed that uses multi-resolution images to enhance efficiency of the identification and that specifically measures the symmetry, orthogonality and uniqueness of the windows.

32 Claims, 12 Drawing Sheets

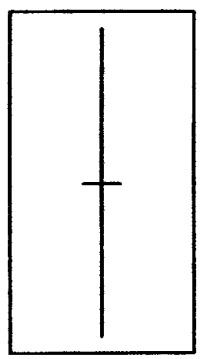 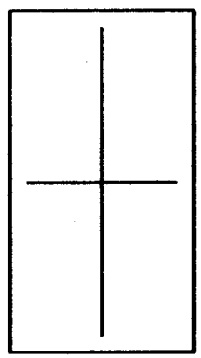 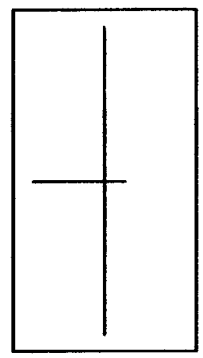 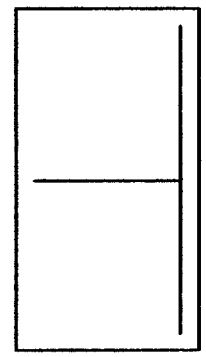
*FIG. 9A*    *FIG. 9B*    *FIG. 9C*    *FIG. 9D*
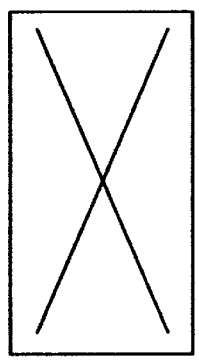 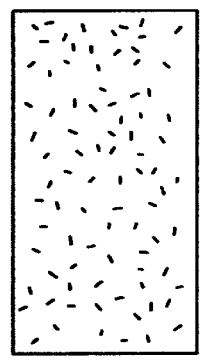 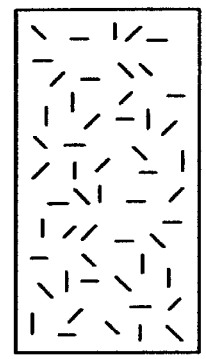
*FIG. 9E*    *FIG. 9F*    *FIG. 9G*

METHOD FOR AUTOMATIC VISUAL IDENTIFICATION OF A REFERENCE SITE IN AN IMAGE

CROSS-REFERENCES TO RELATED APPLICATIONS

This application claims priority of Provisional Application Serial No. 60/093,916 filed on Jul. 23, 1998 and Provisional Application Serial No. 60/095,087 filed on Aug. 3, 1998.

FIELD OF THE INVENTION

This invention relates to machine vision, and particularly to identifying a good reference site in an image using a machine-vision system.

BACKGROUND

In the field of machine vision, a common need is to identify and subsequently repeatably find a reference site within an image. The image is captured by the machine-vision system, where the image is a digital representation of an object within the field of view. The reference site is used to orient the machine to the object. For the reference site to be useful, it must be reliably found and is preferably unique within the field of view of the image.

Uses for reference sites are in the inspection field, where probes must be positioned for test, and in computer control of manufacturing processes, where sequences of operations must be precisely aligned. In the field of inspection of semiconductor devices, reference sites often are flats or notches on an edge of a wafer.

In such applications, the reference site is chosen typically by an operator. Then, the machine-vision system captures an image of the reference site, which is then stored as a template or a model. Thereafter during production, also known in the industry as run-time, the machine-vision system acquires an image of the object, and attempts to find a feature in the image that matches the template or model of the reference site. When the template or model is located, the machine-vision system performs further operations on the run-time images, such as positioning, searching for features or deviation analysis.

In printing applications, frequently reference sites are fiducial marks on the periphery of the object in view. For instance, crosses positioned at edges allow documents to be properly positioned for scanning. Typically, fiducials positioned at edges also orient automatic devices prior to printing.

Many newly designed applications, however, have removed fiducial marks from the objects being viewed. Increasingly unique characteristics from the natural patterns of the image are used as reference sites instead of the fiducial marks.

Without fidicials, operators must select the reference sites based on the "feel" of the image. To choose a viable reference site, which result in commercially good operation, the operator interacting with the selection program must be highly trained. Otherwise, the reference site is found inconsistently during production, if at all. Moreover, as the patterns within the images become more complex, the operator's job becomes even more difficult. Consequently, locating the reference site at run-time has become even less reliable.

In addition to unreliability introduced by the lack of operator training, the use of patterns in the image as the reference site has inherent difficulties. When patterns are used as the reference site, the reference site is a portion of the image that is segmented by a window. A unique pattern within a window that has minimal information in a particular direction may not be a suitable reference site for positioning in that direction. Such a reference site cannot indicate whether the image is upside down. Further, the pattern may not be unique within the field of view such as feature 140 and feature 140' illustrated in image 100 of FIG. 1. Without further processing, the machine cannot choose which of the features 140 or 140' is the reference site. Therefore, the machine may not be oriented properly with respect to the image. Thus, any non-unique feature is not an optimum reference site.

One attempt to replace operators with machines has had limited success owing to the inability to identify the appropriate criteria that repeatably represent a good reference site while producing a fast result. The attempt was embodied in AUTOTRAIN, a software tool sold by Cognex Corporation. AUTOTRAIN measured the standard deviation of two one-dimensional projections and uniqueness of windows to determine if a window was a good reference site candidate. Although AUTOTRAIN was fast, it did not always choose the appropriate reference site, and, at times, would propose a reference site of random noise.

SUMMARY

A method is disclosed for identifying a good reference site in an image which uses at least one measurable parameter to filter windows in the image and present an ordered set of the filtered windows as possible good reference sites.

The at least one measurable parameter indicates the extent of "redundant" information within the possible reference sites. A reference site with "redundant" information can be found repeatably even when portions of the reference site are omitted, skewed, obstructed, or altered owing to production conditions. The method recognizes that selecting proposed reference sites with "redundant" information greatly enhances the quality of proposed reference sites. Preferably "uniqueness" is measured in conjunction with "redundancy."

A value for the parameter is computed for each window in the image, where the windows contain the possible reference sites. Using the value, an ordered set of the windows is produced, where the order depends upon the value of the parameter. Optionally, a portion of the windows are not ordered and instead removed from consideration as reference sites if they fall below a threshold associated with the parameter. The threshold can leave only a single window in the ordered set.

In a preferred embodiment, a plurality of parameters filters the windows in sequence. In this embodiment, each window must pass a threshold of the first parameter before the second parameter is measured. The method can use any combination of parameter thresholds or lack thereof.

Further, when a plurality of parameters are used, the value of each parameter is scaled relative to the other parameters, such as normalized for instance, and then combined to produce the ordered set of windows. Accurate methods of scaling the parameters are disclosed. Optionally, the parameters are weighted according to their relevance before the values of the parameters are combined. At the end, the window having the highest value is expected to be used as the reference site.

In a preferred embodiment, to improve the set of possible reference sites, the conditions for finding a reference site are adjusted for each application and for each image in which a reference site is sought. The conditions can include window size, sampling rate, and weights of the parameters, for example. It is recognized by the invention that providing versatility for these values and states improves the proposed reference sites for each image. Thus, by customization, the embodiment improves selection of the reference site. The method may also be applied iteratively to find which conditions are best for each application and image by evaluating the scores of the proposed reference site from each implementation of the method.

A specific implementation of this method is illustrated and claimed which efficiently extracts information from the image using the parameters of "symmetry", "orthogonality", and "uniqueness," where "symmetry" and "orthogonality" both indicate the extent of "redundancy" of a possible reference site. In a preferred implementation, "symmetry" is the first filter, because it is recognized by the invention that symmetry can be measured on low-resolution images without skewing information, i.e. it is linear, and, therefore, computationally less time-intensive.

The invention solves some of the problems of the prior art. In particular, the invention recognizes the need to customize the method to each application. The customization compensates for the inherent difficulties of using portions of the image for reference sites. In such an application, the role of the operator is reduced, and therefore the reliability of the proposed reference sites is enhanced. Further, the invention measures certain "redundant" aspects of the possible reference sites to increase the likelihood that the proposed reference sites are found repeatably.

BRIEF DESCRIPTION OF THE DRAWINGS

The invention will be more fully understood from the following detailed description, in conjunction with the accompanying figures, wherein:

FIGS. 9A–9G are an example of "redundant" and non-"redundant" windows;

DETAILED DESCRIPTION OF THE DRAWINGS

Figure 8:
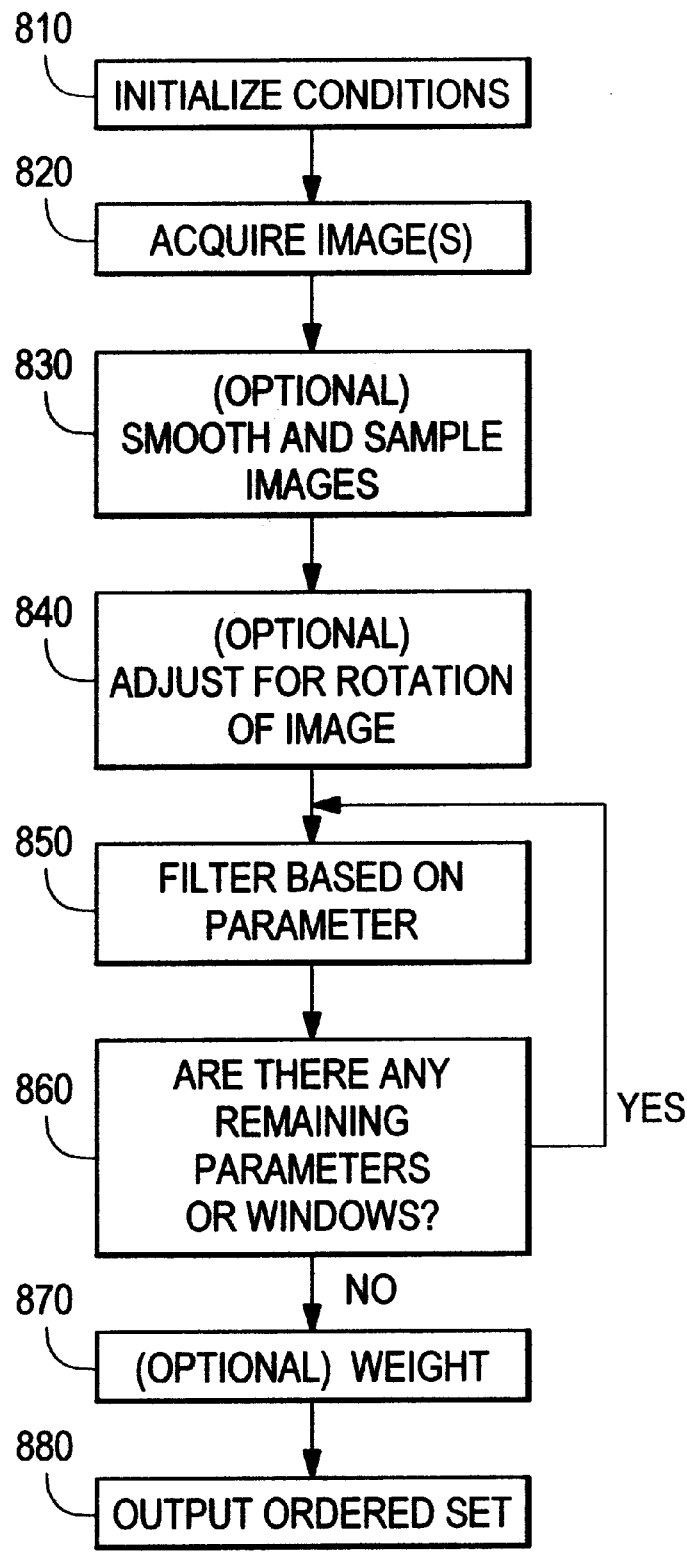
FIG. 8 is a flowchart of the an overview of one embodiment of the method.

FIG. 8 illustrates a flow chart of one embodiment of the method where reference numbers in parenthesis denote the steps of the method. It is the purpose of the method to propose possible reference sites for an image. It is recognized by the invention that the quality of the proposed reference sites is improved by providing versatility for values, such as window size and sampling rate, and providing versatility for computational methods, such as arithmetic mean or geometric mean, for each image searched. Thus, although the initial conditions can be initialized to equal the default values (820), preferably the initial conditions are customized for each application.

More specifically, the initial conditions are adjusted for each grouping of images in which a reference site is sought. In a preferred embodiment, an operator provides the initial conditions. The initial conditions can be values for the window size of the reference site, sampling factor for the image, or weights of parameters, for example. In addition, the initial conditions can also be computational preferences, such as the method to compute a parameter, for example.

Turning first to window size, a window is a rectangular subset of the area in an image. A window encloses a reference site. The preferred size of the window is, in part, a function of the image and the application, but it preferably is not so small that it takes too long to find.

Figure 1:
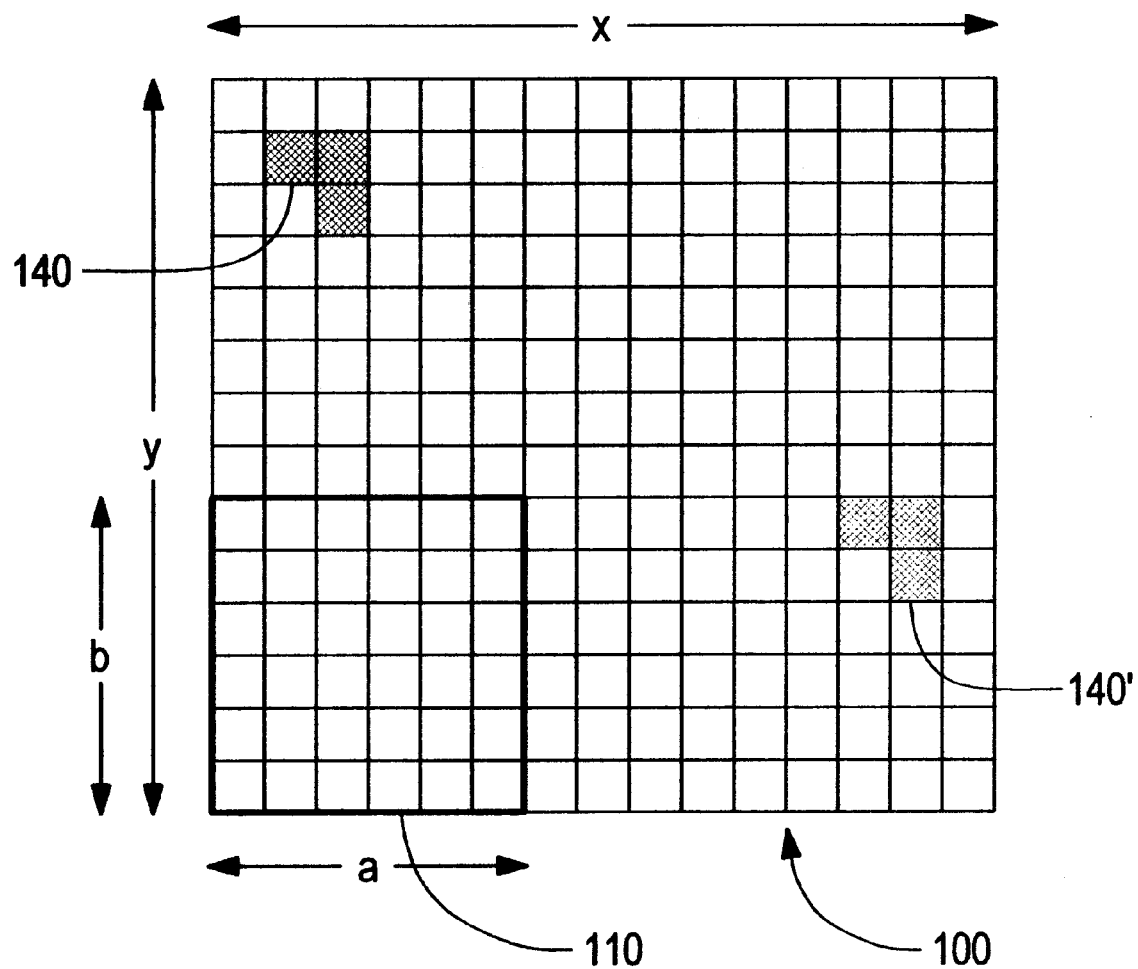
FIG. 1 is a representation of an image showing a window and two features of the image.

To find a reference site, the method considers every area that is window sized in the image. The number of locations considered for a reference site is given by the equation $(x-a+1) * (y-b+1)$, where the size of the image is x by y pixels, such as image 100 illustrated in FIG. 1, and the size of the window is a by b pixels, such as window 110.

Fewer locations are considered when the image has fewer pixels, as in a low-resolution image. Also, in a low-resolution image fewer pixels within each window need to be examined. Thus, a lower-resolution image takes less time to process.

However, an image acquired as a low-resolution image lacks data for any high-frequency features, such as fine lines. Any high-frequency features that are not sampled are eliminated as a part of any possible reference site, and high frequency features may constitute a portion of the best reference sites. Therefore, it may not be desirable to use a low-resolution image to determine a reference site, despite timing issues.

Whether a low-resolution image is acceptable depends upon the image and the application requirements. Low-resolution images save time, without sacrificing the reference site choices, when the image's features are large. For example, a wafer-inspection application examines a wafer composed of pads separated by street corners. The pads and the street corners have to be found within the image to be inspected. Therefore, the pads and corners have to be well represented in the image that is searched. Both the pads and street corners are larger features that will be adequately represented in a low-resolution image Therefore, a lower-resolution image can be used in a wafer-inspection application. In contrast, searching for an object in natural scene, which contains many high frequency features, will more likely than not fail if searched at a lower resolution. Consequently, to enhance the reference site choice, the method customizes the resolution at which the image is evaluated.

In addition to customizing widow size and sampling rate, the manner in which measurements are combined is also customizable. Measurements can be combined in more than one way. For instance, combining measurements using a geometric mean emphasizes the deviations among the measurements, while the arithmetic mean emphasizes the value of one of the measurements. When applied to image analysis, the method chosen will emphasize different aspects of the image. Therefore, depending upon the characteristics of the image, it may be preferrable to compute a parameter's value one way over another.

For example, "orthogonality" is a measure of strength of a pattern or patterns in a window in at least one direction. It is preferred, however, for a window to exhibit strength in two orthogonal directions. Orthogonality in two directions can be calculated as the geometric mean or the arithmetic mean of the two directions. When the arithmetic mean is computed, orthogonality in one direction produces a high score. When the geometric mean is computed, a reference site will have a high orthogonality score only if strong orthogonality exists in both directions. Depending on the choice of arithmetic or geometric mean, the method will emphasize either orthogonality in one direction or two directions, respectively.

The application directs which statistical formula is more appropriate. Consequently, the method optionally accommodates the customization of statistical methods for each of the parameters, but particularly for parameters that are computed in single dimensions and then combined.

Further, if the method measures a plurality of parameters, optionally, the parameters are assigned weights so that the relevance of each parameter is represented in the ordered set, as will be further described with reference to FIG. 2.

Therefore, prior to run-time, during the initialization step the window size is always chosen either by the operator or assigned a default value. Optionally, a sampling rate, weighting for each parameter, and how to calculate each parameter is also assigned. The search for the reference site is then customized for the application. Other initial conditions can also be customized, such as a sequence for the parameters, and further, which parameters are appropriate. The exact number and nature of parameters used depends upon the application requirements, and should be chosen based on the advantages offered by each parameter.

Figure 13:
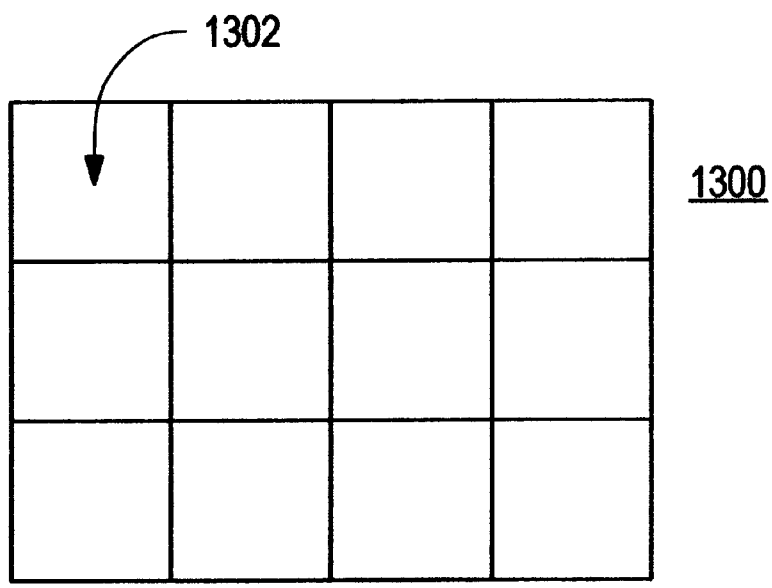
FIG. 13 represents an enlarged image containing more than one field of view.

Returning to FIG. 8, after initialization, the image is acquired (820). The image can encompass one field of view of the object. However, one field of view may not contain the best reference site. The best reference site may be in an adjacent field of view. Therefore, to increase the probability that the best reference site for that application is within the image evaluated by the method, optionally an enlarged image is generated as illustrated on FIG. 13. The enlarged image 1300 is a grouping of more than one field of view 1302.

In addition, the image can be further improved by generating a composite image, where a composite image more accurately represents the variety of images that are typically acquired under production conditions To generate a composite image, a plurality of training images are acquired and combined to create the composite image. The composite image represents the combined effects of production conditions on the training images. For instance, one of the training images could be an image of a part under bad lighting condition, while another has improper focusing. In that example, the composite image contains the degradation caused by the bad lighting and the improper focus within one image. Further, as each object within the training images is typically not at the exact same position, the composite image is blurred to represent the relative movement of objects between the training images caused by this inexact registration.

Finding possible reference sites using the composite image increases the likelihood that the reference sites will be found during production. Thus, the use of the composite image makes the method more robust.

After the image is acquired, optionally, to generate a low-resolution image, the image is smoothed, as is known in the art, and then sampled (830).

Next, the windows within the image are filtered by the parameters (850). Parameters can be rotationally sensitive, where rotationally sensitive parameters have significantly different values depending upon the angular orientation of the image. For instance, when orthogonality measures patterns along the x and y-axis, the same image could have disparate orthogonality values depending upon whether the image's orientation aligned the patterns with the x and y-axes or with the axis at 45° and 135°. The disparate orthogonality values fail to communicate the usefulness of the reference site. Thus, to meaningfully use the value of a rotationally sensitive parameter, the method compensates for the rotation of the image (840).

If the rotation of the image is known, the parameters are adjusted so that they are measured on the rotated image from the angle of rotation, instead of being measured from zero degrees. For instance, if the rotation is 45°, orthogonality is measured at 45°, 135°, 225°, 315° instead of at 0°, 90°, 180°, and 270°. Alternatively, the image is rotated using methods such as those described in currently commonly assigned, co-pending patent application Ser. No. 08/551,120, Image Rotating Method for Locating Bond Pads in an Image, filed Oct. 31, 1995, which is now U.S. Pat. No. 5,754,679 issued May 19, 1998.

If the rotation of the image is not known, each rotationally sensitive parameter can be measured at a plurality of orientations. The maximum values of various parameters would indicate the orientation of the image, and thus which value of the rotationally sensitive parameters are meaningful. Alternatively, the highest value of each parameter from the resulting group of measurements can be used to filter the windows, as described hereinafter. The highest values do not necessarily correspond to the same orientation of the image.

In addition to the values of the parameters, any initial conditions can be determined by iteratively applying this method to an image. For instance, the method can be run with different window sizes, and the proposed reference sites that have the highest score would indicate the appropriate window size.

Next, the windows within the image are filtered by the parameter (850). Although any parameters can be used, the parameters preferably measure the extent of "redundancy" of the possible reference sites and the "uniqueness" of the possible reference sites.

"Uniqueness" indicates whether the possible reference site is unique within the field of view. Uniqueness is the degree of similarity of the window compared to other possible windows within the image. Preferably, a reference site is unique in the image.

"Redundancy" is also a preferred characteristic of a reference site. A window with "redundant" information will more likely be found during production even when some of the information is lost, because a redundant window will still contain enough information for the method to recognize the reference site. During production, images always lose information owing to many factors such as noise, bad lighting, incomplete patterns within the image, mouse bites, among others. Therefore, the more "redundant" information within the window, the better the reference site.

As used herein "redundancy" within a reference site indicates the presence of aspects within a reference site that can be used to find the reference site when some information about the site is missing, obscured, or altered at run-time. Redundant information fulfills a similar function as a checksum, so that the object can be identified even when all parts of the object are not present.

For example, the windows illustrated in FIG. 9A, FIG. 9B, and FIG. 9E are redundant because they are balanced about an axis of symmetry. One side can supply the missing information from the other side of a balanced window. The windows in FIG. 9B, FIG. 9D, and FIG. 9E are also redundant because they have an abundance of information along more than one axis so that the site can be registered using only a portion of the information along each of the axis. This characteristic is called positional stability in the art. Orthogonality is an indicator of positional stability, as are other edge dependent parameters.

FIG. 9F, which is noise, and FIG. 9G, which is texture, are not balanced windows. The method solves one problem of the prior art and does not choose FIGS. 9F and 9G as a good reference site. Noise, illustrated in FIG. 9F, and texture, illustrated in FIG. 9G, often exhibit high positional stability when measured with the projections of the prior art, because noise and texture appears highly directional; a point appears aligned along a multitude of directions. However, with the additional requirement that the site is balanced, the method eliminates FIGS. 9F and 9G from consideration as a possible reference sites.

Preferably, the proposed reference sites have a large amount of redundancy. Therefore, it is preferred that the proposed reference sites have both balance and positional stability, which in this example is FIGS. 9B and 9E. If positional stability is measured only along the x and y-axis, FIG. 9B is the most redundant window out of FIGS. 9A–9G.

The method recognizes that measuring a parameter(s) related to redundancy, and choosing the site with more redundant information, such as sites that have both balance and positional stability, greatly enhances the proposed reference sites.

Each window is filtered (850) by first measuring the parameter for the window. After the value for each window is measured, the value of the parameter is used to order the set of the possible reference sites. Optionally, possible reference sites are also rejected, i.e. filtered out, if the parameter value for a window is below a predetermined threshold. In this manner, a possible reference sites is removed before it is measured by the next parameter.

After the first parameter is considered, the next parameter, if any, will be measured. The process continues until no possible reference sites remain or all the parameters have been measured (860).

When a plurality of parameters are measured, the value of the parameters are combined to yield an ordering for the possible reference sites. Whenever more than one value is combined, the manner of combination has to be determined. The order of a parameter's value depends upon how it is calculated. For instance, the value could be within a scale of 0 to 1, as in normalized correlation, or 0 to 360 as in the orientation of an edge. Combining these two values, without some scaling, would eliminate the effect of the normalized correlation value.

Optionally, if the values were close they are weighted according to their relevance (870), but when the values have very different ranges, the values are scaled before they are combined. The values are scaled such that all the values are within the same smaller range. Depending on the method chosen to compute symmetry or the other parameters, the extent of scaling of each parameter will vary. Therefore, as used herein a parameter's value or scale shall be referred to interchangeably, with the recognition that the value may or may not be scaled, and the value and depends on the application and computational method. Further, any combination of scaling or weighting can be used to determine the score of the possible windows, and therefore the order of the possible reference sites. The scaled values of the parameters are combined and the result dictates the order of the set of windows.

The windows are output as an ordered set (880), with the expectation that the highest candidate becomes the template for production. If any windows were removed by the filtering, they are not listed as part of the ordered set.

Figure 2:
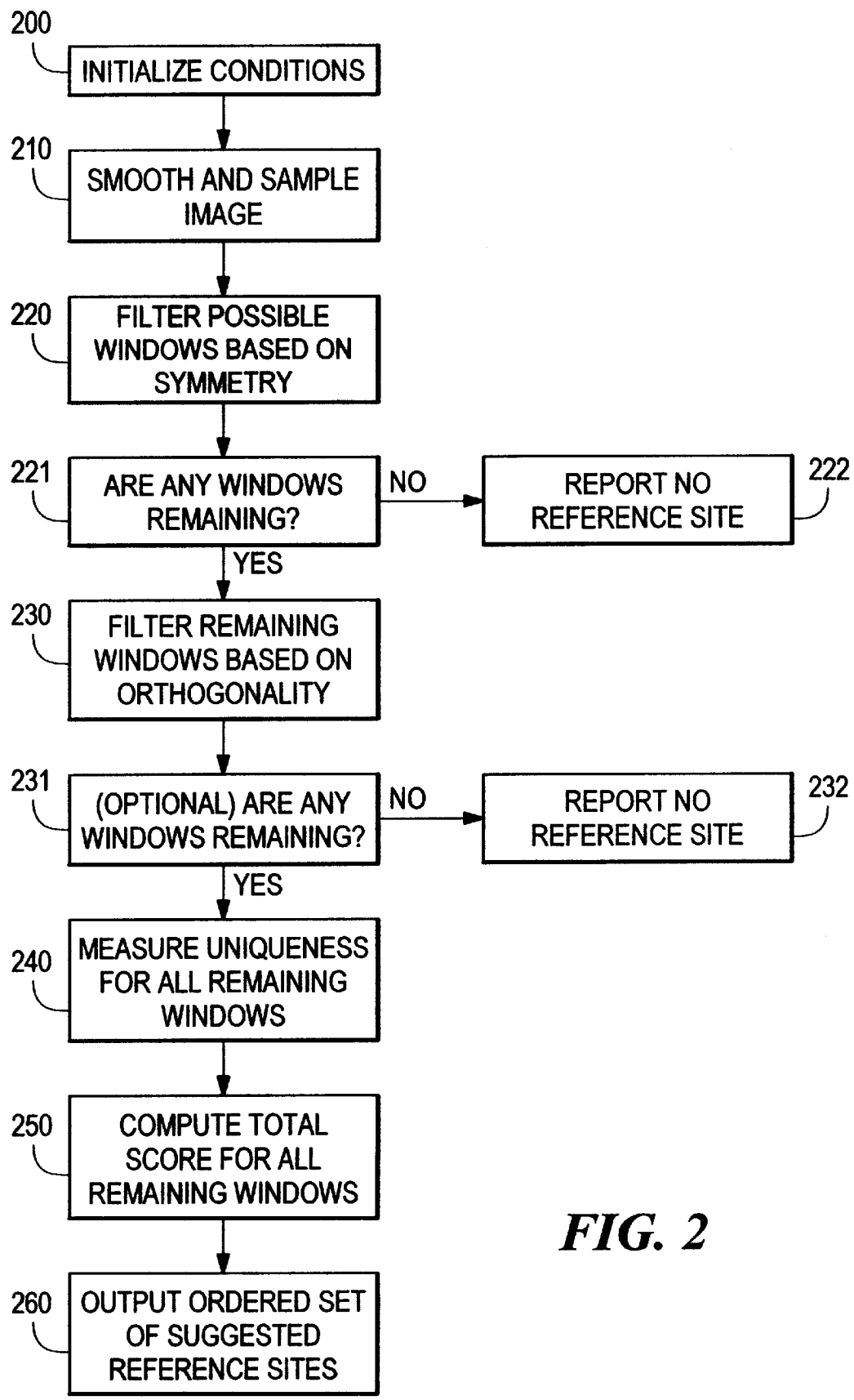
FIG. 2 is a flowchart of an overview of a preferred embodiment of the method.

FIG. 2 illustrates a flow chart of an embodiment of the method using three parameters, where the reference numbers for the steps of the method are enclosed in parenthesis. This implementation uses "symmetry", orthogonality, and uniqueness, in a multi-resolution filter method that enhances efficiency and choice of reference site.

Symmetry for a window is a measure of the similarity between opposite sides of the window surrounding an axis of symmetry, such as the similarity of the top and bottom of a window and/or the left side and the right side of a window. FIGS. 9A, 9B and 9E are symmetric about any axis of symmetry. Symmetry measures the extent of balance of the possible reference site. Perfect symmetry is exhibited by mirror images.

Further, the method recognizes that a symmetry measurement is generally insensitive to high-frequency aspects of the image, such as noise, because it is a linear operator. Consequently, ignoring high-frequency features will not appreciably affect the symmetry value of a window. Further, as a linear operator, it is inexpensive in time to compute. As such, this filter is used on an image with a resolution much less than full-resolution image without losing too much information, and while providing a time advantage. In addition, symmetry is computed without requiring initial assumptions, such as assuming the appropriate magnitude of a threshold. Consequently, the symmetry calculation is less apt to misrepresent the possible reference site. Therefore, this implementation evaluates symmetry on a lower-resolution image, saving time while retaining accuracy.

As previously described, the initial conditions are acquired (200). In this implementation, the initial conditions include window size, weight for symmetry, orthogonality and uniqueness, and statistical combination preference.

Next, as this implementation uses multiple resolutions, the image is smoothed and then sampled (210). The reduced-resolution image is filtered using symmetry (220). Symmetry is measured for each window in the reduced-resolution image. Only those windows having a value over a predetermined threshold are tested for orthogonality and uniqueness. If no windows are above the threshold, no reference site is reported (222). The windows having sufficient symmetry pass to the next filter (221).

Figure 3A:
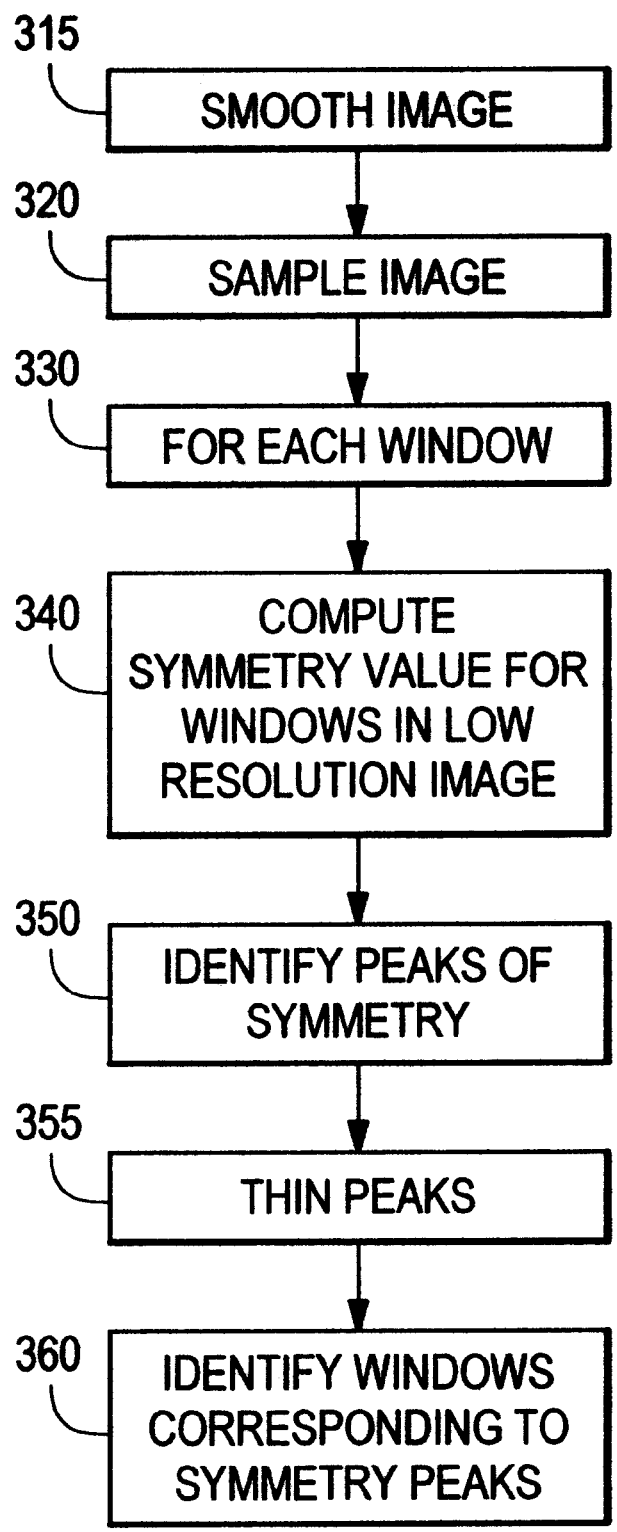
FIG. 3A is a flowchart of one embodiment used to measure symmetry of FIG. 2.
Figure 3B:
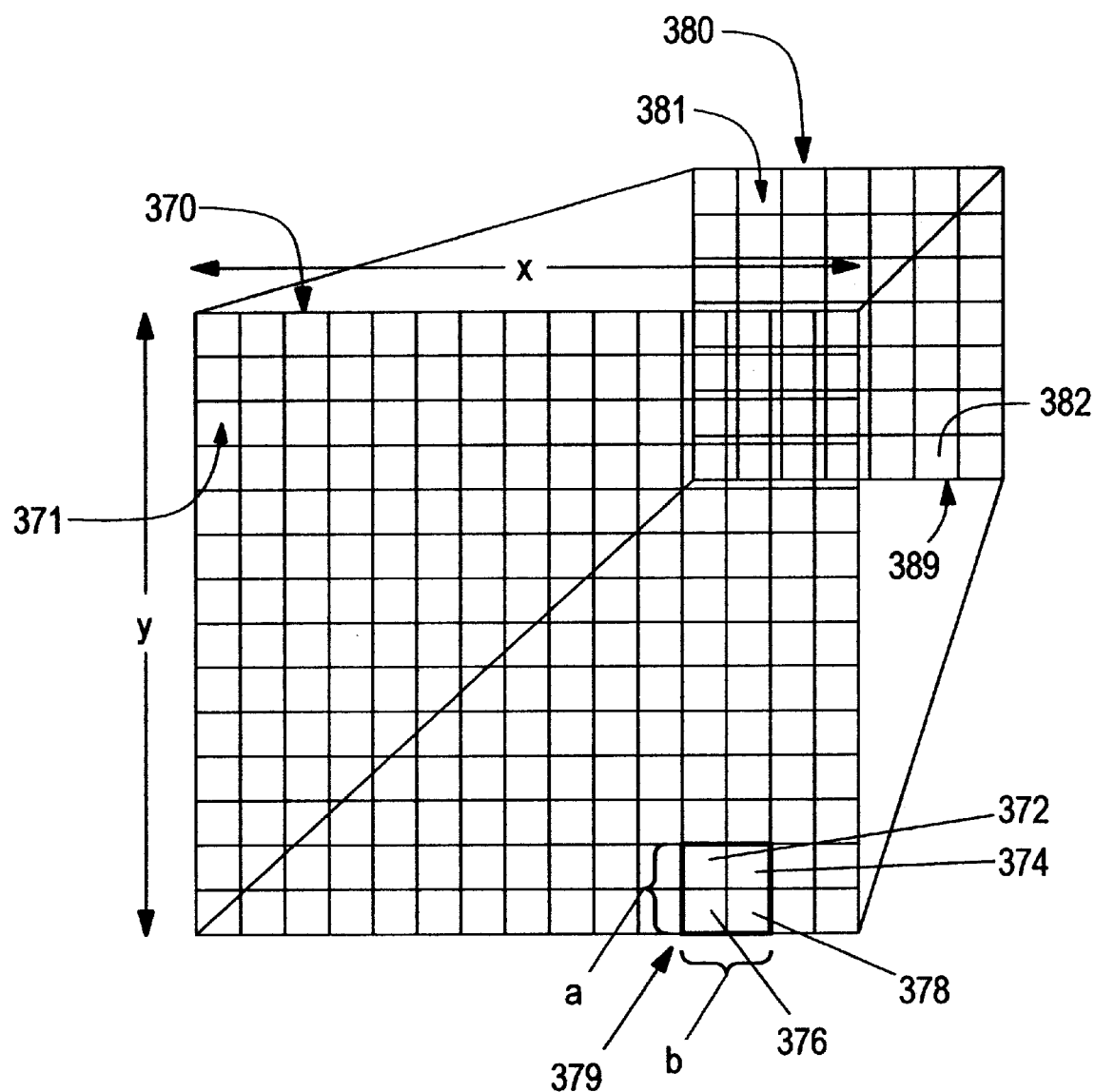
FIG. 3B is a representation of the relationship between a full-resolution image and a reduced-resolution image upon which the symmetry of FIG. 3A is measured.

The reduced-resolution window that passed the symmetry filter corresponds to a plurality of full-resolution windows as is illustrated in FIG. 3B. The image has a full-resolution image representation 370 and a reduced-resolution image representation 380. Each pixel 381 of the resulting reduced-resolution image 380 represents a number of pixels 371 in the full-resolution image 370. For instance, a reduced-resolution pixel 382 represents pixels 372, 374, 376 and 378 in the full-resolution image 370.

In this embodiment, the full-resolution windows, not the reduced-resolution windows are measured for orthogonality, the next filter (230). The orthogonality filter tests the windows for strong concentrations of lines aligned along at least one axis. Optionally, an orthogonality threshold can filter whether a window is also tested for uniqueness (231). When a threshold, if no windows are above the threshold, no reference site is reported (232). Next, the uniqueness of each remaining window is measured (240). Uniqueness is measured by using the window as a model and searching the entire image for a match to the model. Unique windows have poor matches throughout the rest of the image.

Finally, the value for symmetry, orthogonality, and uniqueness are combined using the weighting factors provided during initialization (250). The combined score indicates the merit of each remaining window as a reference site. Using the score, the method outputs an ordered set (260) of the remaining windows to the operator as possible reference sites.

In this embodiment, more windows are measured for symmetry than the other parameters because it is the first filter. However, as discussed above, without appreciable degradation, symmetry can be measured at a lower resolution, and thus save computational time for each window. The more time-intensive calculations are performed only on those windows that pass the symmetry threshold.

Preferably, symmetry is computed on the lowest-resolution image possible. Lowering the resolution of the image reduces the size of each of the windows 379 from a×b pixels to low-resolution windows 389 of the size $(a \times b)/(s^2)$. In addition, lowering the resolution of the image reduces the number of windows measured from $(x-a+1)(y-b+1)$ to $\{[(x-a)/(s*s)]+1\} * \{[(y-b)/(s*s)]+1\}$. For example, a 128×128 window in a 512×512 sampled at s=4, reduces the processing load from testing the 128×128 window 148,225 times to testing a 32×32 window 9409 times.

FIG. 3A illustrates a method for measuring symmetry where steps of operation are enclosed in parenthesis. Before the image is sampled to create the reduced-resolution image, the image is first smoothed (315). Then, the image is sampled (320).

Next, for each window (330), symmetry around the x and y-axes is measured in the low-resolution image (340). While methods such as squares of the differences can be used to compute symmetry, for example, a preferred method is normalized correlation, where normalized correlation is known in the industry. One half of each window is compared to the opposing half of the window and the normalized correlation coefficient of the halves is computed. Next, the top and the bottom are similarly compared. Normalized correlation is preferred over a square of the differences to compute symmetry because flat sections of the image, areas of similarly intensity, have no impact on the normalized correlation result while they decrease the value for sum of the differences.

Each symmetry calculation yields a value between 1 (for a match) through 0 (for no matching). The horizontal and vertical symmetry values are combined using the statistical method assigned during initialization in order to create a value for symmetry that is under 1.

Figure 4A:
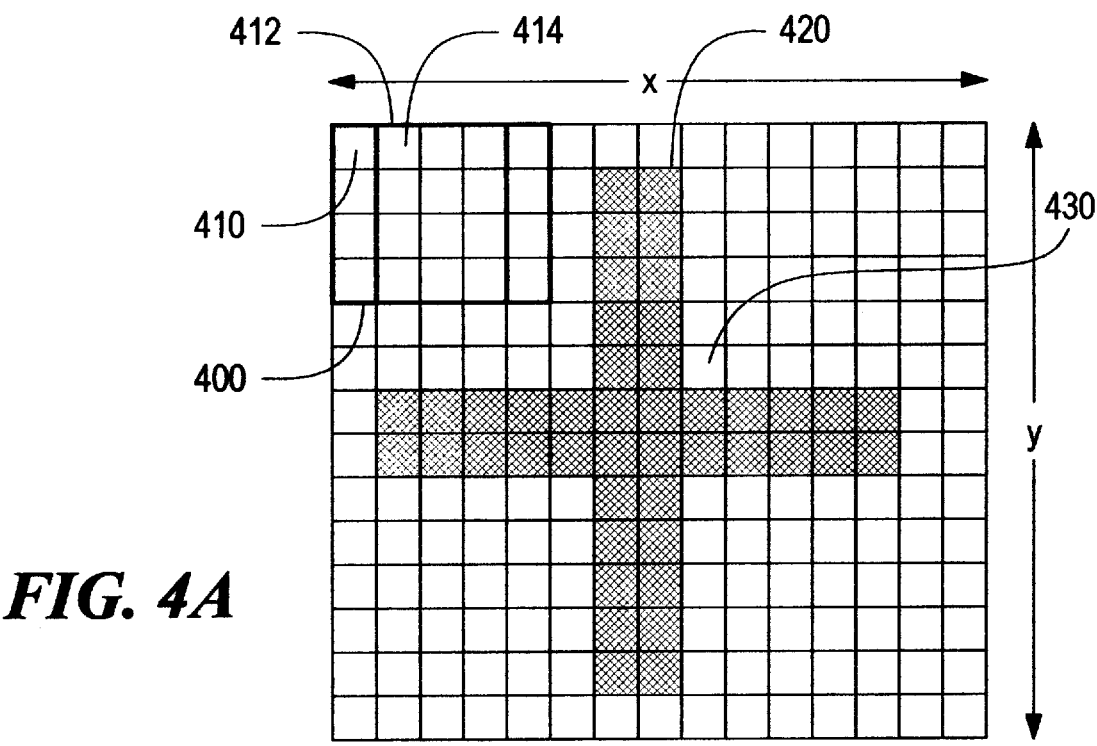
FIGS. 4A and 4B are illustrations of an image and a symmetry surface of the image measured in accordance with FIG. 3A.
Figure 4B:
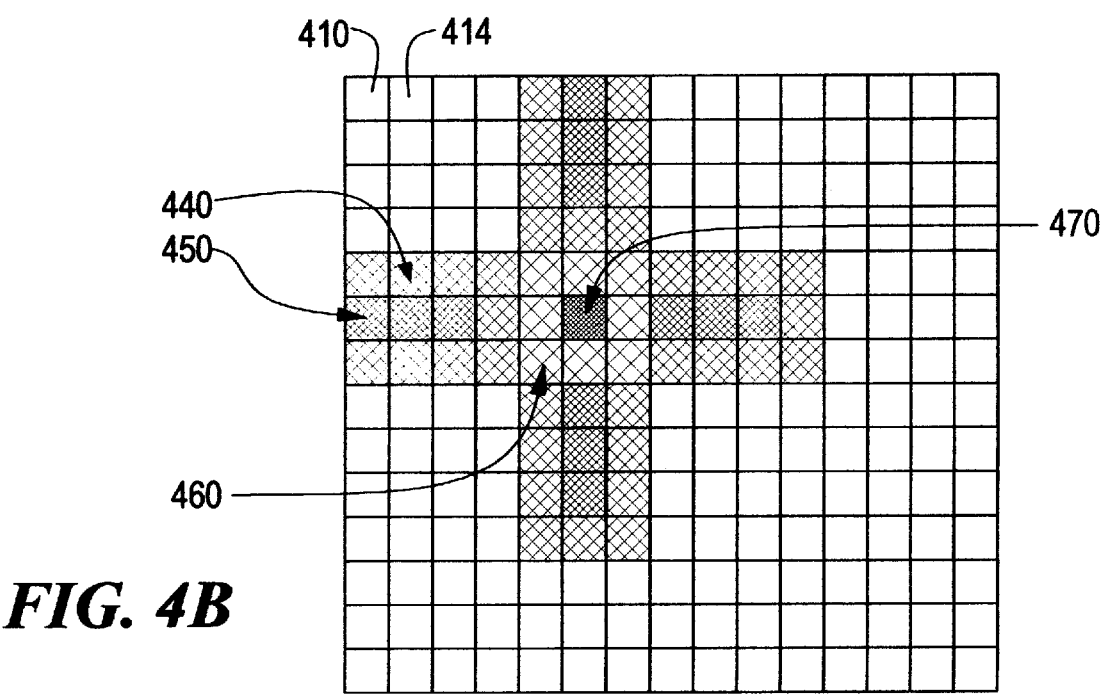

The symmetry value is stored such that the association between the value and the window is maintained. For instance, each time the symmetry of a low-resolution image window is measured, the symmetry value is placed in a matrix at the location of a home pixel of the low-resolution image window, resulting in a matrix of numbers referred to as a symmetry surface. A cross feature 430 and its symmetry surface are illustrated in FIGS. 4A and 4B. The symmetry value of the window 400 is recorded in a home location, such as location 410 on the symmetry surface. The window 400 is then translated to the right to position 412, and the symmetry value at the translated position 412 is stored at location 414 on the symmetry surface. This process is continued for each window position in the image.

On the symmetry surface, the degree of symmetry of each area is shown using graduated shades, where the darkest shade 470 represents the area of the highest symmetry and the lightest shade 460 represents the area of lowest symmetry other than the background.

The symmetry value for a window surrounding the arm 420 is lower as shown by area 440 than when the arm 420 is centered within the window, as is shown by area 450. Very little symmetry exists as illustrated by area 460 when the window is not centered over the crossing arms 430, but partially covers them. However, when the window is centered on the crossing 430, the symmetry value is the highest as shown by area 470, and preferably this peak is identified.

The symmetry value of each window is thresholded to eliminate noise. In a preferred embodiment, the threshold is 10% of the maximum symmetry value. A percentage threshold, such as the 10%, adjusts for the image in view, and is more accurate than an absolute threshold, such as 0.9 symmetry, for example.

In a preferred embodiment, after the thresholding step, the symmetry filter reduces the number of windows using peak analysis before the windows are passed to the next filter. The peaks of the symmetry values are found (350) using any number of methods well known in the art with varying degrees of success. Methods that typically find peaks are often insufficient to locate peaks in the symmetry surface without also locating areas that are not peaks, such as noise and ridges. A peak is defined as any position having a high curvature along two or more orthogonal axes with a magnitude above the threshold. Noise also has a high curvature along two axes, but the magnitude of its symmetry value is much less than a peak. In contrast, a ridge only has a high curvature along substantially one direction and a minimal curvature in the orthogonal direction.

Symmetry is a slowly changing metric. When symmetry is measured on a smoothed and subsampled image, the symmetry value represented in a few pixels in the full-resolution image is broadened so that the value influences several pixels in the reduced-resolution image. Therefore, most peaks span several pixel positions in the symmetry surface. A value that does not correspond to a peak, such as the ridge indicated by area 450, is also represented in the symmetry surface that spans several pixel positions. Well-known methods cannot adequately find the peaks without also finding the ridges.

Figure 5:
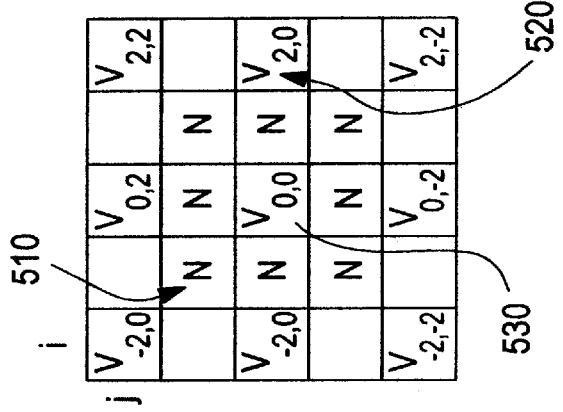
FIG. 5 is an illustration of a window position on a symmetry surface and its neighbors.

A preferred method to isolate the peaks on the symmetry surface is to compare the symmetry values of the window with its neighbors and at least a portion of its extended neighbors. A symmetry surface and its neighbors are illustrated in FIG. 5. The window position 530, designated by $V_{0,0}$, has neighbors 510, designated by an N and has extended neighbors 520, a portion of which are designated by a $V_{i,j}$. The neighbors form a 3 by 3 neighborhood and the extended neighbors form a 5 by 5 neighborhood.

Since neighboring windows often have similar values, a local peak is defined as a pixle position having a symmetry value greater than all its neighbors in the 3 by 3 neighborhood. Although for simplicity, each shade on the symmetry surface has been said to represent one symmetry value, invariably one pixel position within each area is slightly greater than all its neighbors. The slight difference will make at least one pixel position within each area a local peak, such as one pixel on the arm, for example. The local peak on the arm is a ridge. To discard the local peaks representing ridges, the local peaks are then compared with some of their extended neighbors in the 5 by 5 neighborhood.

In a preferred embodiment, the symmetry values within a 5 by 5 neighborhood are processed during smoothing and sampling to eliminate the effects of a peak in the full-resolution image on the extended neighbors in the reduced-resolution image. With the influence on the extended neighbors eliminated, the change in value of a symmetry surface between the peak position and the extended neighbors will indicate a greater change in value than without such processing.

Figures 12A, 12B:
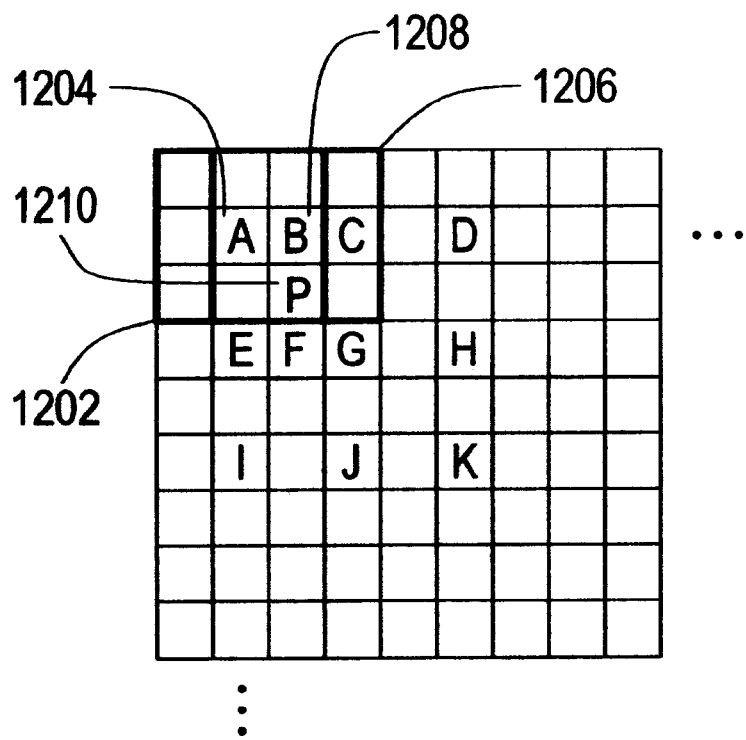
FIGS. 12A and 12B are representations of a part of a full-resolution image and a reduced-resolution image, respectively.
Figure 12C:
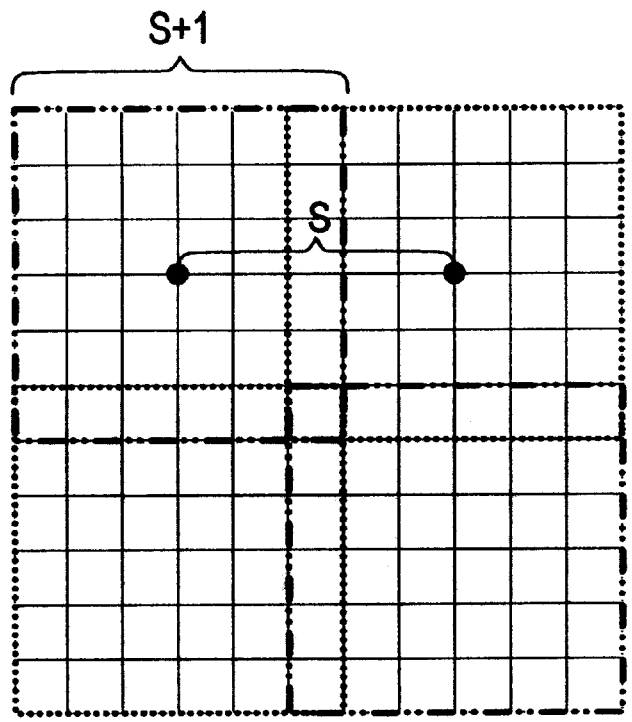
FIG. 12C illustrates the relationship of sand s+1 on a full-resolution image.

In a preferred embodiment, the processing consists of smoothing the initial image at with a guassian kernel of width s+1, subsampling the image at s, and then meausring symmetry on the reduced-resolution image. This is illustrated with reference to FIGS. 12A–12C. FIG. 12A is a portion of a full-resolution image. After the image is acquired, the image is smoothed using a kernel of width s+1. Scan have any value, and the relationship of s to the full-resolution image is illustrated in FIG. 12C.

Using s=2 as an example, however, the smoothing kernel is a 3×3 kernel. As such, the smoothed value of window 1202 is stored as the new value in the smoothed image at position 1204 designated A. Likewise, the smoothed value corresponding to window 1206 is stored in the smoothed image at position 1208 designated B. The smoothing kernel is applied at all positions in the full-resolution image.

Then, the image is sampled at s=2 to generate the reduced-resolution image represented in FIG. 12B. Sampling at s=2 of the smoothed image corresponds to keeping the value of every other row and every other column. Pixel position 1210 designated 'P', is within a 3 by 3 neighborhood of A, B, C, E, F, and G in the full-resolution image. When the image is smoothed with a kernel of width s+1 and sampled at s, P will influence A', C', E', and G' of the resulting reduced-resolution image. Thus, P influences A' and its neighbors in a 2 by 2 neighborhood in the reduced-resolution image, but not the extended neighbor D', H', K', I', or J' of A' in the reduced-resolution image. Because the full-resolution image is smoothed with a s+1 kernel, and then sampled at s, no pixel intensity value in the full-resolution in the 3 by 3 neighborhood of A which has influenced the value of A' also contributes to the value of positions H', I', J', D', and K' in the reduced-resolution image. Thus, if a symmetry peak existed at A in the full-resolution image, it would not influence the value at H' in the reduced-resolution image.

Therefore, peaks can be distinguished from ridges by evaluating each local peak against its extended neighbors of the symmetry surface. When the change in value is greater than a predetermined amount, the position is identified as a symmetry peak, where the predetermined amount is greater than the change in value ordinarily found between neighbors in a symmetry surface. In a preferred embodiment, the predetermined amount is that the peak must be greater than all its extended neighbor values by 10% of the maximum symmetry value.

Peaks of other metrics of sampled images can also be identified using this processing procedure and obvious extensions thereof combined with the peak detection using extended neighbors in variously sized neighborhoods. Further, as some smoothing is always inherent in an image, whether or not reduced, the evaluation of extended neighbors even without the smoothing to sampling relationship will improve peak detection.

In this application, when the symmetry peaks are identified using the preferred method, the symmetry value is the value of the second derivative of the symmetry peak. With reference to FIG. 5, the symmetry value is given by the lessor of:

$$P_{00}=V_{00}-(V_{-2,0}+V_{2,0})/2 \text{ or}$$

$$P_{00}=V_{00}-(V_{0,-2}+V_{0,2})/2$$

The second derivative characterizes sharpness of a peak, and is an apt score for a metric that changes very slowly and often exhibits wide peaks.

Figure 6:
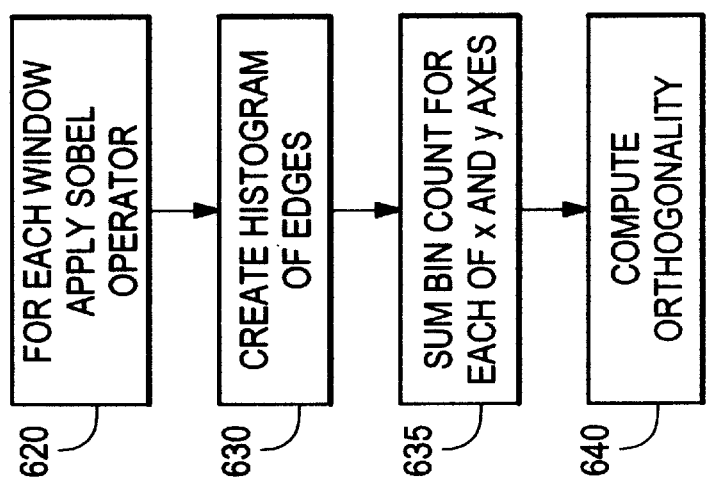
FIG. 6 is a flowchart of one embodiment used to measure orthogonality of FIG. 2.

The windows at full-resolution corresponding to the symmetry peaks found in the reduced-resolution image are then filtered by orthogonality. Orthogonality is calculated as is illustrated in FIG. 6, where steps of operation are noted in parenthesis. For some applications, strong orthogonality along one axis is sufficient. In others, it is preferred to have a reference site having a strong concentration of patterns oriented along two or more axes, including up to 360°, because such a reference site can establish the rotational position of the image.

Orthogonality of a window is measured by finding edges in the window, and measuring the strength of the edges along the relevant axis. Edges are identified using known methods, such as applying Sobel neighborhood operators to each pixel in the window to produce an edge angle and edge magnitude for each pixel (620). For pixels on an edge of a pattern, the Sobel operators associate an edge magnitude (weight) and edge angle (direction) with that pixel.

Figure 11A:
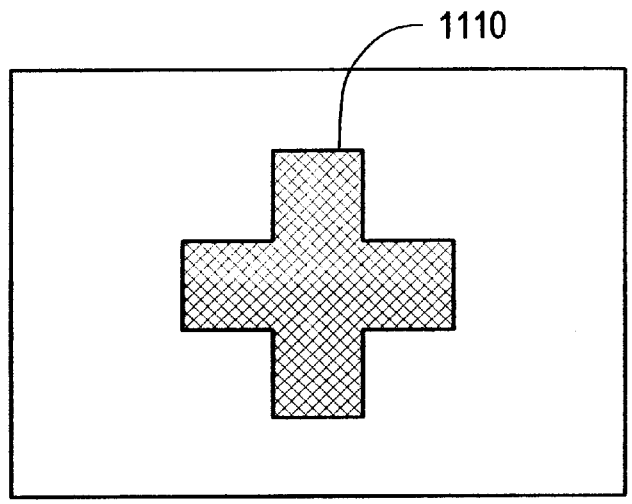
FIGS. 11A and 11B are an illustration of a feature and its angle histogram that are used during the orthogonality measurement of FIG. 6.
Figure 11B:
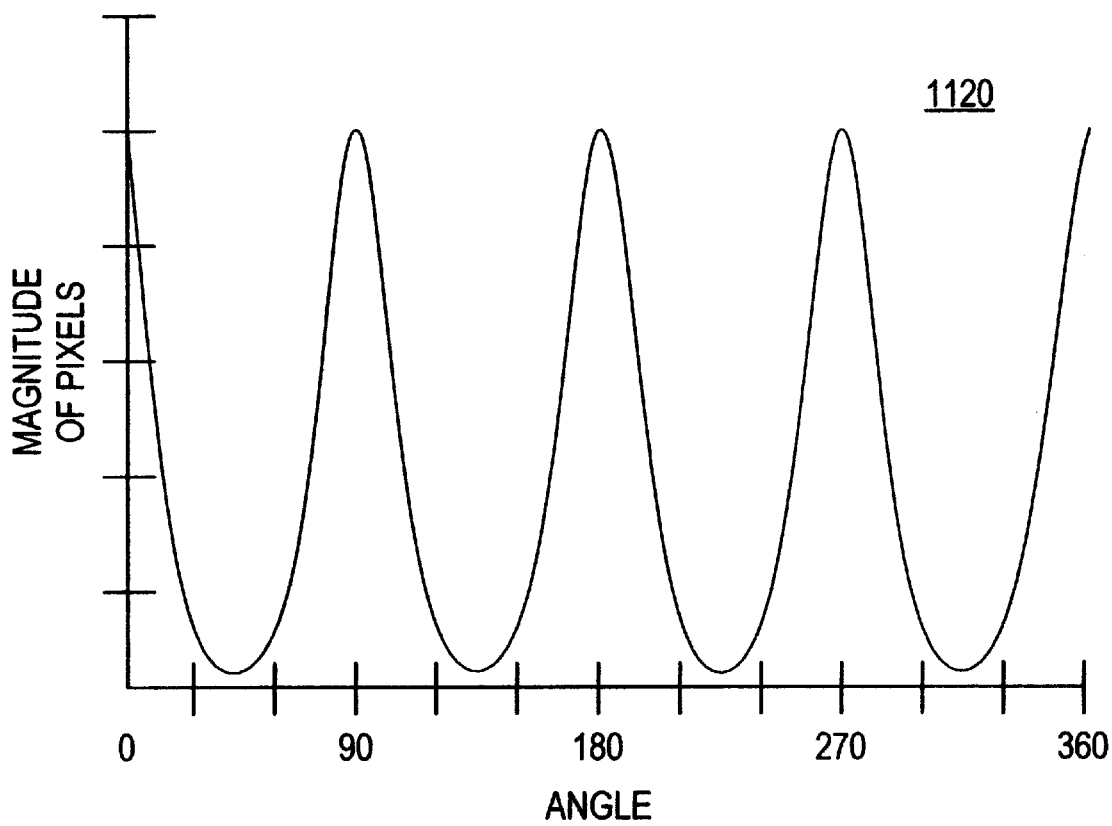

The edge magnitudes and edge angles of the pixels within the window are mapped in an angle histogram (630). Generally, a histogram is a frequency distribution of a graph of a set of numbers. The angle histogram here is a representation of the strength of the pixels at each angle, where the bins on the x-axis of the histogram are labeled by edge angles of the pixel, and the y-axis denotes the sum of the magnitudes of the pixels having that edge angle. An example of a cross feature 1110 and its continuous angle histogram 1120 are shown in FIGS. 11A and 11B, respectively.

Computing orthogonality using Sobel operators has inherent drawbacks. First, the magnitude of broad-lined features is under represented because the Sobel operators typically find the pixels on the edges of the features, and not the pixels in the center of the broad-lines. Second, all the edge angles do not map directly into bins representing strength in the y- and x- axes. Instead, the relevant edge angles form a distribution around the bins of 0°, 90°, 180°, and 270°. Further, edges are usually smeared to some extent. Consequently, not all the edges having angles oriented along the x-axis or y-axis are represented in the bins for 0°, 90°, 180°, and 270°.

To compensate for this under representation, in a preferred embodiment, a range of bins determines the axial weight instead of a single bin. The magnitude of pixels from multiple bins surrounding 0°, 90°, 180°, and 270° are summed as part of that window's orthogonality (635). Each bin represents a quantized range of angles. For instance, each bin represents 1.4° when the edge angle is represented digitally by eight bits. With 8 bits available to represent an angle, the histogram x-axis can represent 257 discrete angles within the 360°. Using this quantization and a range of 4 bins, the weight of pattern along the positive y-axis equals the sum of the histogram values in bins representing 84.4° through 95.6°, for example.

To further refine which windows are given strong orthogonality values, in one embodiment, only connected edges are summed as part of the orthogonality value for each window. Connected edges are found using various methods such as edge following or edge linking techniques described in Computer Vision, Boundary Tracking, Chapter 4, Dana Ballard and Christopher M. Brown, Prentice Hall, Inc. (1982), which is incorporated herein by reference.

Once the orthogonality is measured along the x and y-axes, the orthogonality values are combined using the mean calculation specified during initialization. In a preferred implementation, the orthogonality value is scaled by dividing the minimum number of pixels in the 0° plus 180° and 90° plus 270° bin by the number of all the pixels in the window. The scaling generates a higher value for a window with a greater percentage of the total edges within the window being oriented along the x and y-axes. In a preferred embodiment, as a value of 0.2 would represent a highly orthogonal window, all values are multiplied by 5.

This scaling approximates normalization and keeps the value of orthogonality below 1. The final value indicates a higher orthogonality as the value approaches 1. Again, the scaling is tailored appropriately to each application.

Figure 7:
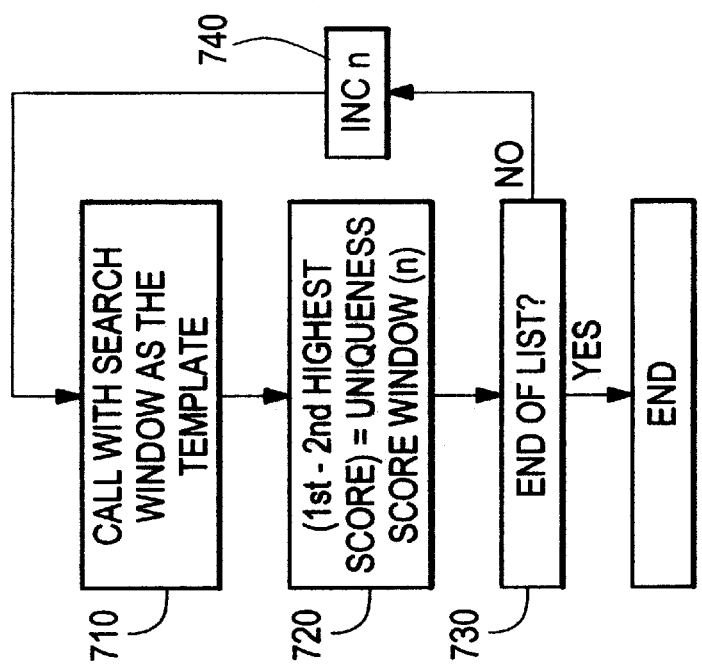
FIG. 7 is a flowchart of one embodiment used to measure uniqueness of FIG. 2.

Turning to FIG. 7, FIG. 7 is a flow chart of the method to measure the uniqueness of a window, where the steps of the method are noted in parenthesis. Uniqueness is measured by searching the image for a copy of each remaining window, if no copies are found the window is not unique. A search for the match to the window can be performed using any alignment tool that finds an instance of one pattern within another. One such tool is SEARCH, by Cognex. Searching methods are known in the art, one example is described at Vision Tools, Cognex 3000/4000/5000 Programmable Vision Engines, Chapter 1, and are incorporated herein by reference. SEARCH is implemented using the possible window as a template (710). SEARCH will find the window; the question is whether it will find copies of the window.

The result of the uniqueness test is a similarity value for each window in the image compared against the template. These values are then combined to represent the uniqueness of the window against the entire image. Again, the values are scaled for each application as appropriate. In a preferred implementation, the scaled value is the correlation value of the window tested against itself, which presumably has the highest similarity score, minus the second highest correlation value (720). Other measurements can be made to indicate the window's uniqueness, such as comparing the distance of the window to features with a high correlation.

The uniqueness measurement is continued until all remaining windows are modeled, searched and scored (730 and 740).

Figure 10:
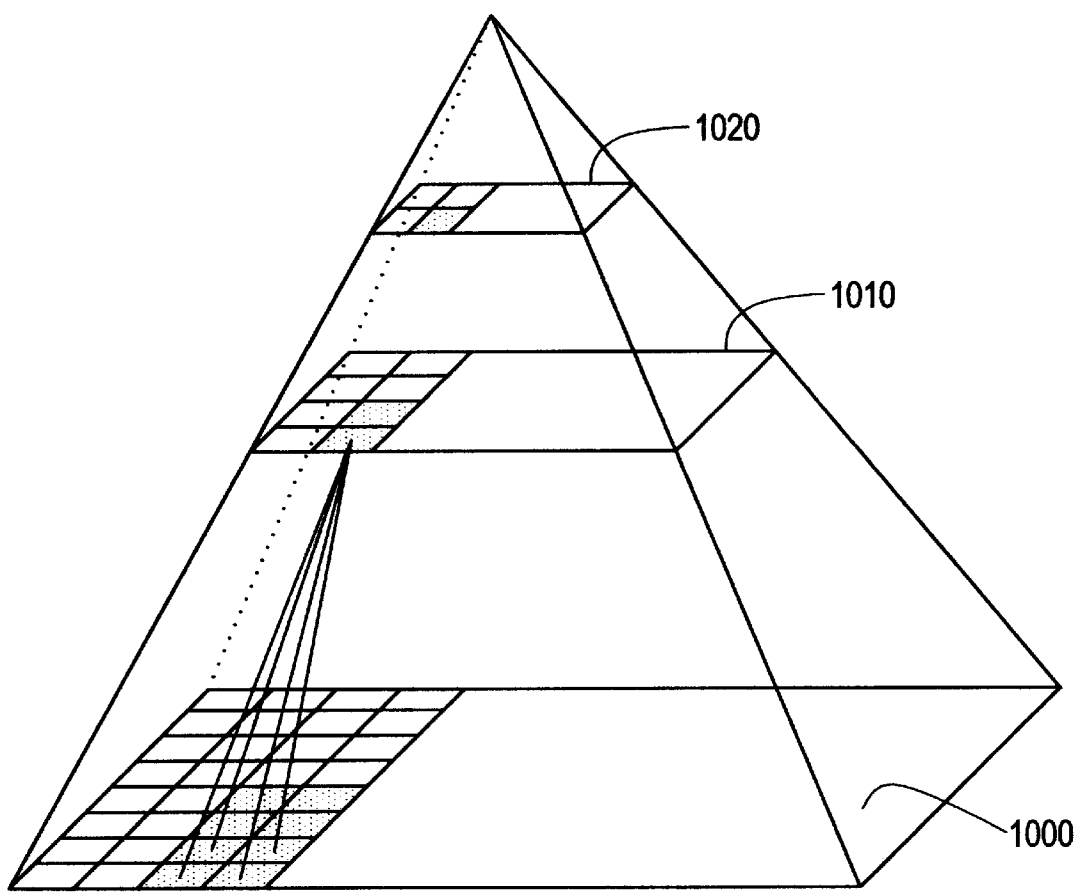
FIG. 10 is an illustration of the relationship between multi-resolution images used in a preferred embodiment of the method.

The efficiency of the embodiment of FIG. 2 is enhanced by using an additional resolution of the image, as is illustrated in FIG. 10. In this embodiment, the full-resolution image 1000 is sampled to produce a mid-resolution image 1010 and a low-resolution image 1020. Each higher-resolution image is smoothed before it is sampled to create the lower-resolution image.

The sampling factor provided by the operator is the sampling factor, s, used to generate the mid-resolution image 1010. It is this image upon which orthogonality and uniqueness are measured. Using an image less than the full-resolution enhances performance time, and as the sampling factor is customized to the image, reliability is not appreciably sacrificed.

Symmetry, unlike orthogonality or uniqueness is measured using the lower-resolution image 1020, and the windows that pass the symmetry filter are subjected to the orthogonality test at the mid-resolution image 1010. For example, one window passing the symmetry test can provide four mid-resolution windows to test for orthogonality.

When using this multi-level resolution implementation, the tiers of the resolution are preferably related. Knowing the relationship allows mapping windows between the resolutions. One preferred relationship is for the lower-resolution image 1020 to be sampled at a second sampling factor, s', which is related to the initialized sampling factor, s, by the following formulas:

If $s<4, s'=4$;

If $4<s \leq 16$, $s'=16/s$(rounded);

If $s>16$, $s'=1$.

However, any pyramidal relationship can be chosen as long as it is known.

Othogonality measurements are also modified so that the range of bins summed surrounding the axes (635) are determined by the equation (2s+2) bins. This allows some of the local distortion that may have been caused by sampling to decreased. The values of all these bins are summed to yield a total value for the axis.

Other modifications and implementations will occur to those skilled in the art without departing from the spirit and the scope of the invention as claimed. Accordingly, the above description is not intended to limit the invention except as indicated in the following claims.

What I claim is:

1. A method for automatic visual identification of a reference site in an image comprising:

identifying at least one parameter that indicates an extent of redundancy within a possible reference site, the extent of redundancy within the possible reference site includes representing a degree of balance of image data of the possible reference site;

wherein symmetry is a measure of the degree of balance of the image data within the possible reference site, and wherein orthogonality and the symmetry are measures of the extent of redundancy of the possible reference site, and wherein the at least one parameter includes the symmetry, the orthogonality and uniqueness of the possible reference site;

acquiring the image;

filtering windows in the image using the at least one parameter so as to provide an ordered set of possible reference sites; and reporting the ordered set of possible reference sites.

2. The method of claim 1, wherein filtering the windows in the image using the at least one parameter so as to provide the ordered set of possible reference sites further includes:

according to a predetermined sequence of the at least one parameter, using each one of the at least one parameter, in turn, to filter the windows in the image so as to provide the ordered set of possible reference sites.

3. The method of claim 1, further comprising smoothing and sampling the image prior to filtering.

4. The method of claim 1, wherein the ordered set of possible reference sites includes one possible reference site.

5. The method of claim 1, wherein the at least one parameter includes symmetry of a possible reference site, and filtering the windows in the image using the at least one parameter so as to provide the ordered set of possible reference sites further comprises:

smoothing and sampling the image to produce a reduced-resolution image;

measuring similarity of opposed halves of the windows, the opposed halves being defined by an axis of symmetry in at least one direction to provide symmetry values; and ordering the windows as a function of the symmetry values to provide the ordered set of possible reference sites.

6. The method of claim 1, wherein the at least one parameter includes symmetry of the possible reference site, and filtering the windows in the image using the at leas tone parameter so as to provide the ordered set of possible reference sites further comprises:

performing normalized correlation between halves of the windows to generate at least one correlation coefficient score for each window, the halves being defined by an axis of symmetry in at least one direction, and filtering the windows so as to order the windows using the at least one correlation coefficient score for each of the windows.

7. The method of claim 1, wherein the at least one parameter includes orthogonality, and filtering the windows in the image using the at least one parameter so as to provide the ordered set of possible reference sites comprises:

applying an edge extraction tool to each of the windows to yield a set of angles for each edge pixel within each of the windows;

transforming the set of angles for each of the windows into a radial histogram;

summing a number of the edge pixels in the radial histogram approximately about two axes to provide an orthogonality score for each of the windows; and ordering the windows by the orthogonality score.

8. The method of claim 1, wherein user supplied variables are accommodated, the method further comprising:

providing a sampling rate at which to acquire the image, where the sampling rate is a user supplied variable.

9. The method of claim 1, wherein user supplied variables are accommodated, the method further comprising:

providing a window size of the possible reference sites, where the window size is a user supplied variable.

10. The method of claim 1, wherein user supplied variables are accommodated, the method further comprising:

providing a computational method for the at least one parameter, where the computational method is a user supplied variable.

11. The method of claim 1, wherein user supplied variables are accommodated, and wherein choice of averaging method, for each of the at least one parameter, is a user supplied variable.

12. A method for automatic visual identification of a reference site in an image comprising:

identifying a plurality of measurable parameters that characterize a good reference site, at least one of the plurality of measurable parameters adapted to measure an extent of redundancy, including balance of image data, within a possible reference site;

wherein symmetry is a measure of the balance of the image data within the possible reference site, and wherein orthogonality and the symmetry are measures of the extent of redundancy of the possible reference site, and wherein the plurality of measurable parameters include the symmetry, the orthogonality and uniqueness of the possible reference site;

selecting a sequence of the plurality of measurable parameters to be used for filtering;

acquiring the image;

filtering windows in the image using the plurality of measurable parameters in the sequence so as to provide an ordered set of possible reference sites; and reporting the ordered set of possible reference sites.

13. A method for automatic visual identification of a reference site in an image comprising:

providing a redundancy parameter that characterizes balance of image data within an window;

wherein symmetry is a measure of the balance of image data within the possible reference site, and wherein orthogonality and the symmetry are measures of an extent of the redundancy of the possible reference site, and wherein the redundancy parameter includes the symmetry and the orthogonality of the possible reference site;

providing a uniqueness parameter that characterizes uniqueness of a window in the image;

acquiring the image;

filtering windows in the image using the redundancy parameter followed by the uniqueness parameter so as to provide an ordered set of possible reference sites; and reporting the ordered set of possible reference sites.

14. The method of claim 1, wherein filtering the windows in the image further includes:

according to a predetermined sequence of the at least one parameter, using a first one of the at least one parameter to filter the windows so as to provide a subset of the windows that meets the first one of the at least one parameter; and filtering the subset of the windows using, other than the first one, the at least one parameter, according to the predetermined sequence, so as to provide the ordered set of possible reference sites.

15. The method of claim 5, wherein two sets of the opposed halves of the windows are defined by the x-axis and the y-axis, respectively, and wherein filtering further comprises:

combining the symmetry values for each one of the windows to provide a single similarity value for each one of the windows.

16. The method of claim 5, wherein filtering further comprises:

storing on a symmetry surface, at an origin of each of the windows, the symmetry values, respectively for each of the windows;

thresholding the symmetry surface;

identifying peaks on the symmetry surface;

assigning windows corresponding to the peaks as the possible reference sites, and ordering the possible reference sites by a magnitude of the peaks corresponding thereto.

17. The method of claim 5, wherein filtering further comprises:
  storing on a symmetry surface, at an origin of each of the windows, the symmetry values, respectively for each of the windows;
  thresholding the symmetry surface;
  identifying peaks on the symmetry surface;
  calculating second derivatives of the peaks as symmetry scores for the windows corresponding to the peaks; and
  wherein ordering further comprises ordering the windows by the symmetry scores.

18. The method of claim 17, wherein filtering further comprises:
  assigning a smaller of the second derivatives for each of the peaks as the symmetry scores, respectively, of each of the peaks.

19. The method of claim 1, wherein filtering further comprises:
  measuring each of the at least one parameter for each of the windows to provide scores;
  filtering the windows using a function of the scores so as to provide the ordered set of possible reference sites.

20. The method of claim 1, wherein reporting the ordered set of possible reference sites further includes:
  reporting the ordered set of possible reference sites as a plurality of reference sites from which a user can choose one of the plurality of reference sites as the reference site.

21. The method of claim 1, wherein reporting further comprises:
  reporting a highest ordered possible reference site from the ordered set of possible reference sites as the reference site.

22. The method of claim 12, wherein the plurality of measurable parameters include symmetry of the possible reference site, and filtering the windows further comprises:
  performing normalized correlation between halves of the windows to generate at least one correlation coefficient score for each of the windows to generate at least one correlation coefficient score for each of the windows, the halves being defined by an axis of symmetry in at least one direction, and
  filtering the windows so as to order the windows using the at least one correlation coefficient score for each of the windows.

23. The method of claim 12, wherein user supplied variables are accommodated, the method further comprising:
  providing a sampling rate at which to acquire the image, where the sampling rate is a user supplied variable.

24. The method of claim 12, wherein user supplied variables are accommodated, the method further comprising:
  providing a window size of the possible reference sites, where the window size is a user supplied variable.

25. The method of claim 13, wherein providing the redundancy parameter further comprises:
  providing the redundancy parameter that characterizes positional stability of the window.

26. The method of claim 13, wherein providing the redundancy parameter further comprises:
  providing a plurality of redundancy parameters, at least one of the plurality of redundancy parameters characterizes the balance of the image data.

27. The method of claim 26, wherein at least one of the plurality of redundancy parameters characterizes positional stability of the window.

28. The method of claim 13, wherein filtering further includes:
  filtering the windows using the redundancy parameter so as to provide a subset of the windows that have adequate redundancy; and
  filtering the subset of the windows using the uniqueness parameter.

29. The method of claim 13, wherein the redundancy parameter includes symmetry of the possible reference site, and filtering the windows in the image further comprises:
  performing normalized correlation between halves of the windows to generate at least one correlation coefficient score for each of the windows, the halves being defined by an axis of symmetry in at least one direction, and
  filtering the windows using the at least one correlation coefficient score for each of the windows so as to provide a sub-set of possible reference sites to be evaluated by the uniqueness parameter.

30. The method of claim 13, wherein user supplied variables are accommodated, the method further comprising:
  providing a sampling rate at which to acquire the image, where the sampling rate is a user supplied variable.

31. The method of claim 13, wherein user supplied variables are accommodated, the method further comprising:
  providing a window size of the possible reference sites, where the window size is a user supplied variable.

32. The method of claim 14, wherein filtering windows in the image using the at least one parameter in the predetermined sequence so as to provide an ordered set of possible reference sites comprises:
  measuring each of the at least one parameter for each of the windows to provide scores;
  weighting the score of each of the at least one parameter for each of the windows to provide weighted scores;
  combining the weighted scores for each of the windows to yield a combined score for each of the windows; and
  generating the ordered set of possible reference sites using the combined score for each of the windows.

* * * * *